United States Patent
Franzke et al.

(10) Patent No.: US 9,261,154 B2
(45) Date of Patent: Feb. 16, 2016

(54) MOTOR VEHICLE AXLE WITH SUBFRAME

(71) Applicant: Benteler Automobiltechnik GmbH, Paderborn (DE)

(72) Inventors: Andreas Franzke, Paderborn (DE); Ralf Pape, Porta Westfalica (DE); Markus Rowinski, Bad Driburg (DE)

(73) Assignee: BENTELER AUTOMOBILTECHNIK GMBH, Paderborn (DE)

( * ) Notice: Subject to any disclaimer, the term of this patent is extended or adjusted under 35 U.S.C. 154(b) by 0 days.

(21) Appl. No.: 14/293,451

(22) Filed: Jun. 2, 2014

(65) Prior Publication Data
US 2014/0361582 A1 Dec. 11, 2014

(51) Int. Cl.
*F16F 1/38* (2006.01)
*B62D 21/11* (2006.01)

(52) U.S. Cl.
CPC .............. *F16F 1/3842* (2013.01); *B62D 21/11* (2013.01)

(58) Field of Classification Search
CPC .................................. F16F 1/3842; B62D 21/11
USPC ..................................................... 280/124.109
See application file for complete search history.

(56) References Cited

U.S. PATENT DOCUMENTS

| | | | |
|---|---|---|---|
| 3,512,800 A * | 5/1970 | Van Winsen .................... 280/788 |
| 7,429,053 B2 * | 9/2008 | Katagiri et al. ......... 280/124.109 |
| 7,832,748 B2 * | 11/2010 | Cariou et al. .......... 280/124.109 |
| 2003/0084917 A1 | 5/2003 | Pape et al. |
| 2005/0046215 A1* | 3/2005 | Chung ............................ 296/29 |
| 2006/0049603 A1 | 3/2006 | Katagiri et al. |
| 2008/0029943 A1 | 2/2008 | Mayerboeck et al. |

FOREIGN PATENT DOCUMENTS

| | | |
|---|---|---|
| DE | 10058113 A1 | 6/2002 |
| DE | 102005042779 | 5/2006 |
| DE | 102007031437 | 2/2009 |
| DE | 102011103511 | 1/2012 |

* cited by examiner

*Primary Examiner* — Faye M Fleming
(74) *Attorney, Agent, or Firm* — Henry M. Feiereisen LLC

(57) ABSTRACT

A motor vehicle axle includes a subframe which has a bushing for linkage to a vehicle body. The bushing defines an axis and includes a bushing body and a face plate which is welded to the bushing body via a weld seam and has a contact surface which is raised in relation to the weld seam, as viewed in a direction of the axis.

10 Claims, 4 Drawing Sheets

MOTOR VEHICLE AXLE WITH SUBFRAME

CROSS-REFERENCES TO RELATED APPLICATIONS

This application claims the priority of German Patent Application, Serial No. 10 2013 106 001.3, filed Jun. 10, 2013, pursuant to 35 U.S.C. 119(a)-(d), the disclosure of which is incorporated herein by reference in its entirety as if fully set forth herein.

BACKGROUND OF THE INVENTION

The present invention relates to a motor vehicle axle with a subframe for linkage to a vehicle body.

The following discussion of related art is provided to assist the reader in understanding the advantages of the invention, and is not to be construed as an admission that this related art is prior art to this invention.

Motor vehicle axles are known in the art having a subframe for linkage to a vehicle body, with control arms, wheels and/or shock absorbers being connected to the subframe to produce the chassis. The subframe typically has connecting crossbeams which extend underneath the motor vehicle floor. Connected to the crossbeams are frame components for control arms and/or mounts for attachment of the subframe to the vehicle body. In view of the loads to be expected and in particular because of the influence of gravity upon the vehicle body, the chassis rests upon the subframe.

It would be desirable and advantageous to provide an improved motor vehicle axle with subframe to obviate prior art shortcomings and to construct it so as to be easy and cost-effectively to produce and to be reliable in operation.

SUMMARY OF THE INVENTION

According to one aspect of the present invention, a motor vehicle axle includes a subframe having a bushing for linkage to a vehicle body, the bushing defining an axis and including a bushing body and a face plate which is welded to the bushing body via a weld seam and has a contact surface which is raised in relation to the weld seam, as viewed in a direction of the axis.

In accordance with the present invention, it is now possible to first produce the bushing body, using conventional tube manufacturing processes. The bushing body may also be implemented as an extruded part or impact extrusion part. Thus, the bushing body may be configured of any individually selected length in a simple and cost-effective manner. An attachment onto the vehicle body can be implemented by welding the face plate as welded part onto the bushing body of selected length. Welding involves in particular spot welding or provision of a continuous circumferential weld seam. In relation to the vertical direction, the contact surface of the face plate is positioned at a distance above the weld seam. In this way, the face plate is not adversely affected in terms of geometric precision and thus prevented from uneven contact upon the vehicle body, despite changes in the surface characteristics caused by the welding process, for example as a result of material melting or added filler material. Thus, the bushings can be produced at high reproducibility and connected to the subframe so that motor vehicle axles can be manufactured with such a subframe at high precision with respect to attachment points of the vehicle body.

According to another advantageous feature of the present invention, the bushing body can be configured in the form of a tube. The cross section tube can thus be best suited to the demanded space dimensions at hand and/or to the stress to be expected. It is therefore possible to produce not only round tubes as bushing body that is then provided with a face plate, but the tubes may have an angular cross section, e.g. polygonal cross section, or oval cross section. Of course, combinations of the afore-mentioned cross sections are conceivable as well in order to conform the bushing body to the installation situation in the subframe and/or to the stress to be expected.

According to another advantageous feature of the present invention, the tube may be longitudinally welded and/or clinched and/or roll formed and/or extruded. Both the tube and the face plate may be made of metal, e.g. steel material or light metal material.

According to another advantageous feature of the present invention, the face plate can have a depression, thereby forming the contact surface for attachment to the vehicle body. Thus, the face plate is configured as formed part which is shaped in such a way as to produce a contact surface which is raised vertically upwards in relation to the ends of the face plate in the later installation situation, with the ends of the face plate, in turn, being welded to the bushing body. This ensures a distance between the weld seam or flanged seam and the contact surface, thereby ensuring high geometric precision of the subframe while at the same time guaranteeing reproducibility.

According to another advantageous feature of the present invention, the face plate can have a U-shaped cross section and defines a bottom plate which forms the contact surface, and legs which extend from the bottom plate and are welded to the bushing body. Advantageously, the U-shaped face plate is configured as a pot.

According to another aspect of the present invention, a method includes welding ends of legs of a face plate to confronting ends of a tubular body along a weld seam, such that a contact surface of the face plate is raised in relation to the weld seam, as viewed in an axial direction, thereby producing a bushing for linkage of a subframe for a motor vehicle axle to a vehicle body.

According to another advantageous feature of the present invention, a bottom of the face plate between the legs can be recessed outwards to form the contact surface.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figures 1, 2:
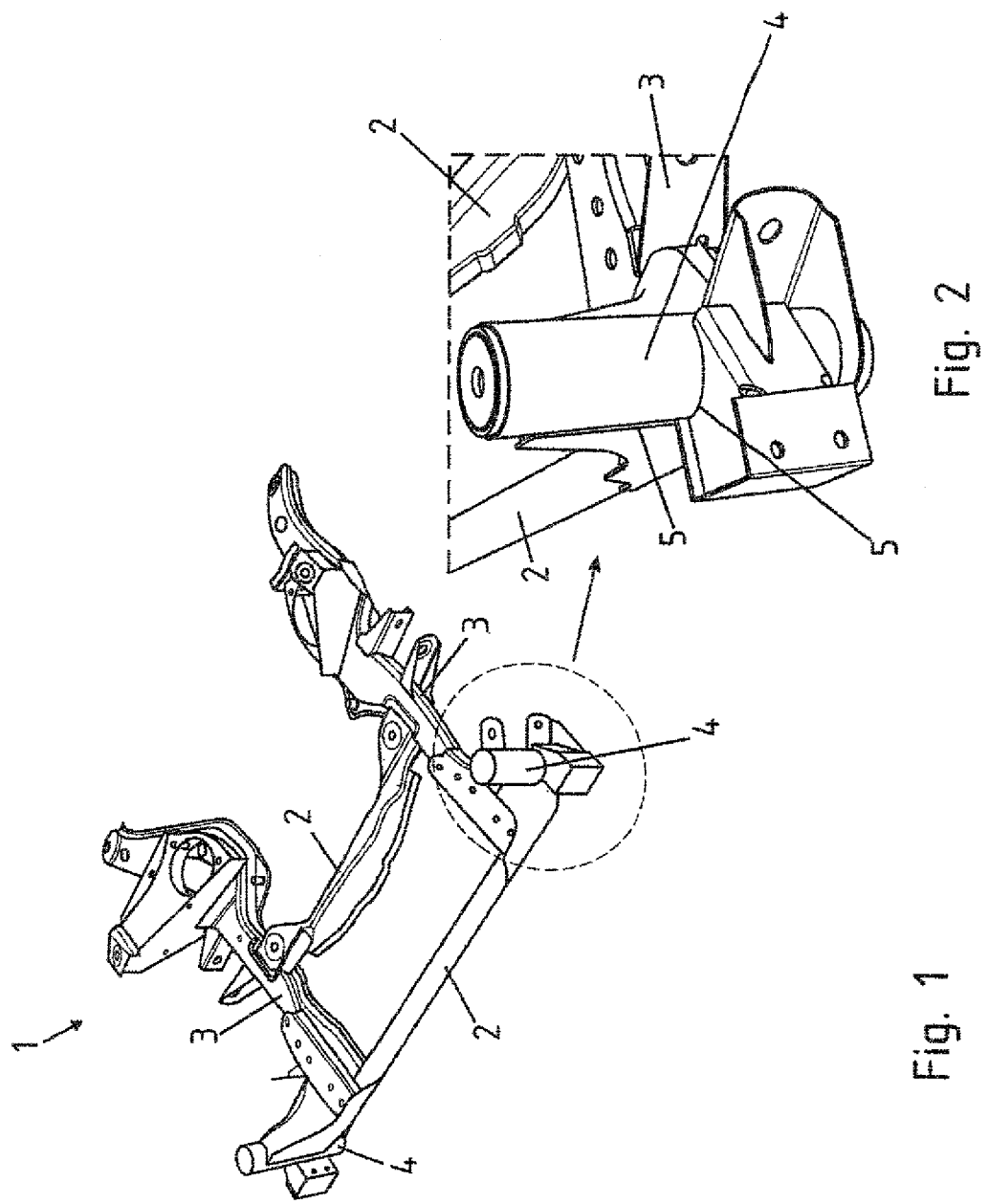
FIG. 1 is a top perspective view of a subframe according to the present invention for manufacture of a motor vehicle axle.
FIG. 2 is an enlarged detailed perspective view of the area encircled in FIG. 1, depicting a bushing on the subframe.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a top perspective view of a subframe according to the present invention, generally designated by reference numeral 1. The subframe 1 includes two crossbeams 2 having ends to which frame elements 3 are coupled, respectively. Mounted to the frame elements 3 are bushings 4 by which the subframe 1 is linked to the motor vehicle axle, not shown.

FIG. 2 is an enlarged perspective view of the area encircled in FIG. 1, depicting the bushing 4 in greater detail. The bushing 4 is secured in the frame element 3 via weld seams 5 in a formfitting manner and by a material joint.

Figure 3:
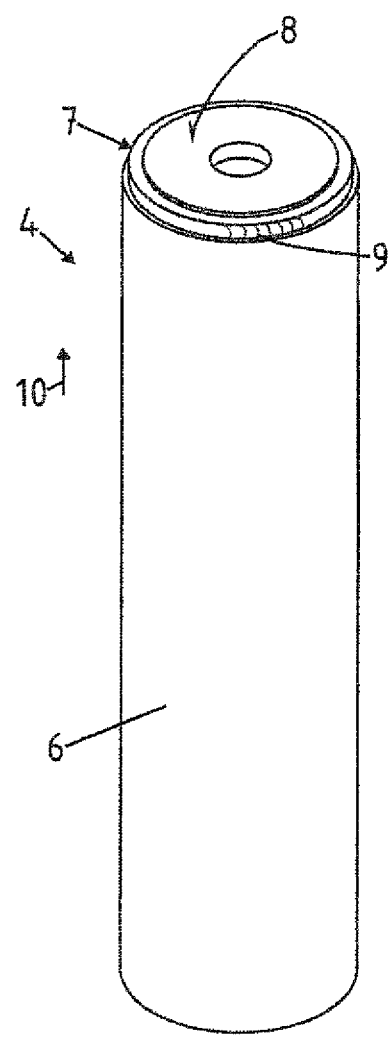
FIG. 3 is a top perspective view of the bushing.

FIG. 3 shows a top perspective view of the bushing 4 and it can be seen that the bushing 4 includes a bushing body 6 and a face plate 7 which in turn has a contact surface 8. The face plate 7 is connected to the bushing body 6 via a circumferential weld seam 9. In relation to the vertical direction, indicated by arrow 10, the contact surface 8 is raised relative to the busing body 6 and the weld seam 9, i.e. the contact surface 8 is positioned at a vertical distance above the weld seam 9.

Figure 4:
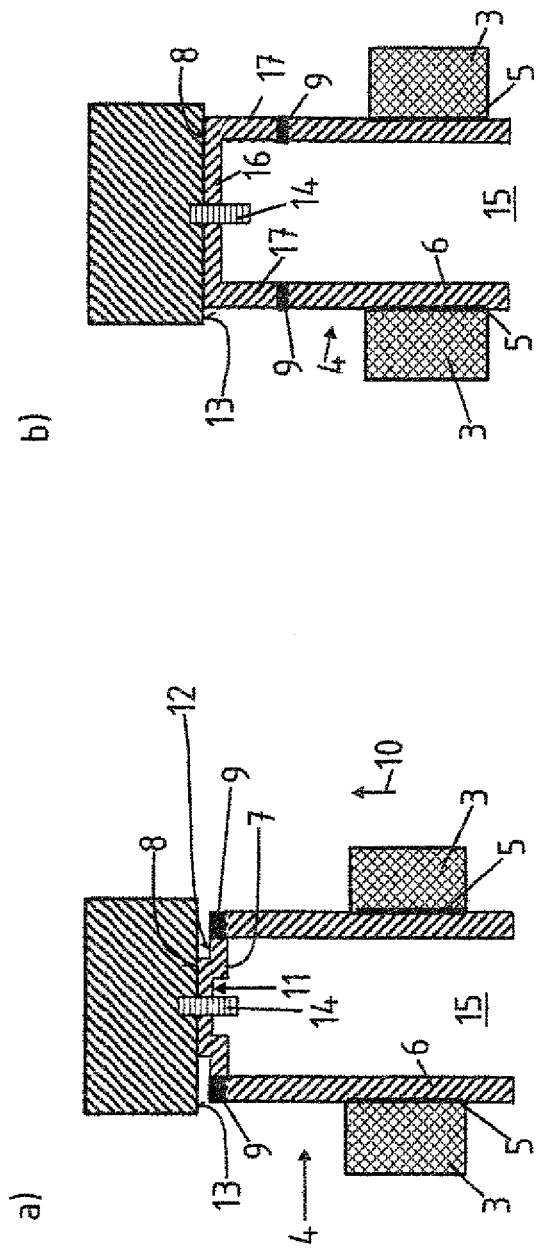
FIG. 4a is a cross sectional view of one embodiment of a bushing according to the present invention for attachment to a vehicle body.
FIG. 4b is a cross sectional view of another embodiment of a bushing according to the present invention for attachment to the vehicle body.

FIGS. 4a, 4b show cross sectional views of various embodiments of the bushing 4 according to the invention. According to FIG. 4a, the face plate 7 is realized as a formed part and has a depression 11 to thereby form the upwardly raised contact surface 8 in relation to a surface 12 of the face plate 7. The contact surface 8 rests formfittingly at a contact point 13 of a vehicle body, only indicated here, and is secured by a threaded connection 14 which can be realized via a hollow space 15 of the bushing body 6. Further indicated are the frame elements 13 which are connected to the bushing body 6 by respective weld seams 5. The weld seam 9 is arranged below the contact surface 8, as viewed in the vertical direction 10, so that the contact surface 8 can be coupled with the contact point 13 in a formfitting and very precise manner.

FIG. 4b shows another embodiment of the bushing 4 in which the face plate 7 has in cross section a U-shaped cup or pot-shaped part and also in this embodiment a contact surface 8 which contacts the contact point 13 of the vehicle body in a formfitting manner. The pot-shaped part has a bottom plate 16 and legs 17 extending from the bottom plate from opposite ends. The ends of the legs 17 are welded by a weld seam 9 to the confronting ends of the bushing body 6 so as to secure the face plate 7 to the bushing body 6.

Figure 5:
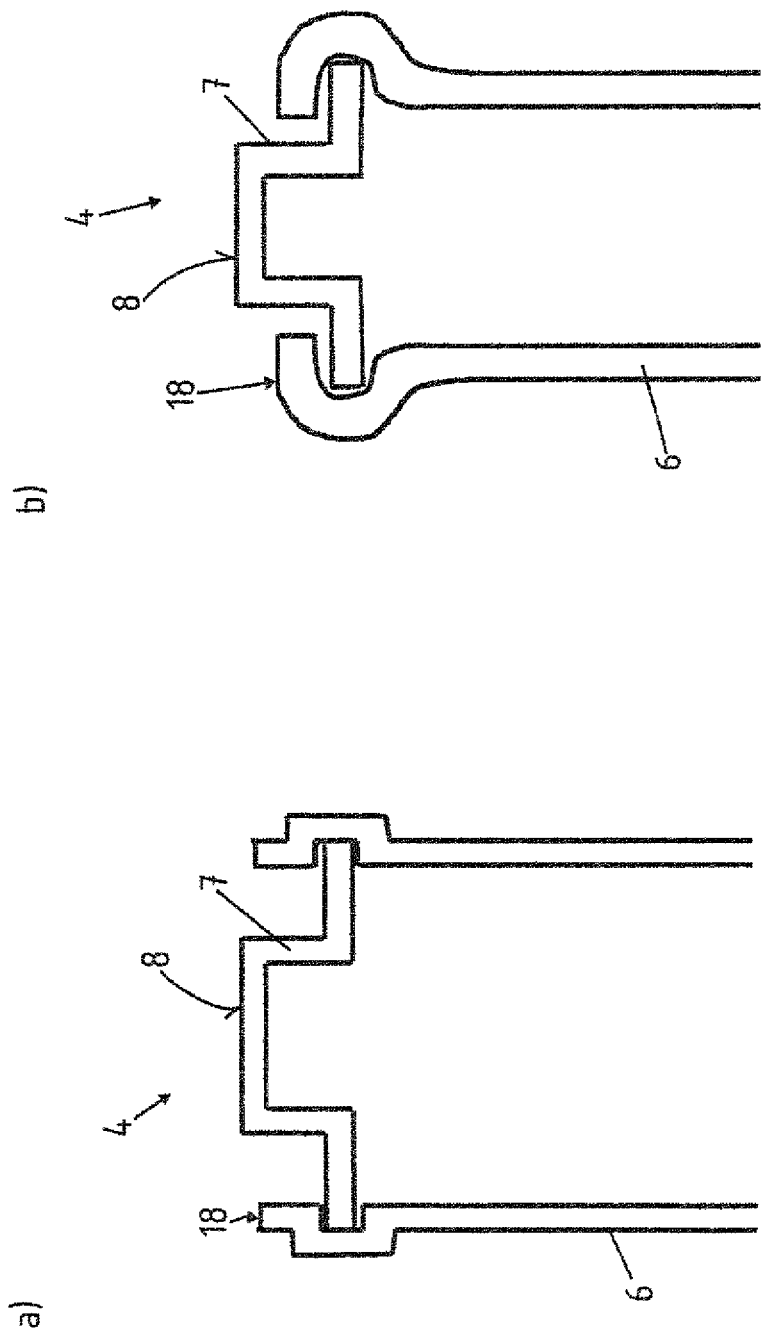
FIG. 5a is a schematic illustration of a bushing as a pressed part.
FIG. 5b is a schematic illustration of a bushing as a flanged part.

FIGS. 5a, 5b show two different cross sectional views of a bushing 4. FIG. 5a shows one embodiment of a bushing 4 which is configured as a pressed part having a bushing body 6 and a face plate 7, with the face plate 7 being pressed into the bushing body 6. FIG. 5b shows another embodiment of a bushing 4 which is configured as a flanged part, with a bushing body 6 having flanged or bent ends 17 so that the face plate 7 is coupled formfittingly. Common to both embodiments is the raised position of the contact surface 8 of the face plate 7 in relation to the end 18 of the bushing body 6.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A motor vehicle axle, comprising a subframe having a bushing for linkage to a vehicle body, said bushing defining an axis and including a bushing body and a face plate which is welded to the bushing body at an upper end of the bushing body via a weld seam and has a contact surface which is raised in relation to the weld seam, as viewed in a direction of the axis.

2. The motor vehicle axle of claim 1, wherein the bushing body is configured in the form of a tube.

3. The motor vehicle axle of claim 2, wherein the tube has a round cross section, or angular cross section, or oval cross section.

4. The motor vehicle axle of claim 2, wherein the tube is longitudinally welded or clinched or roll formed or extruded.

5. The motor vehicle axle of claim 2, wherein the tube and the face plate are made of a material selected from the group consisting of metal, steel, and light metal.

6. The motor vehicle axle of claim 1, wherein the face plate has a depression, thereby forming the contact surface.

7. The motor vehicle axle of claim 1, wherein the face plate has a U-shaped cross section and defines a bottom plate which forms the contact surface, and legs which extend from the bottom plate and are welded to the bushing body.

8. A method, comprising welding ends of legs of a face plate to confronting ends of a tubular body along a weld seam, such that a contact surface of the face plate is raised in relation to the weld seam, as viewed in an axial direction, thereby producing a bushing for linkage of a subframe for a motor vehicle axle to a vehicle body.

9. The method of claim 8, further comprising recessing a bottom of the face plate between the legs outwards to form the contact surface.

10. The method of claim 8, wherein the face plate is spot-welded to the bushing body.

* * * * *